Aug. 24, 1965 C. J. BYRNE 3,202,765

SYNCHRONIZATION OF FREQUENCY MULTIPLEX SYSTEMS

Filed Aug. 23, 1961 2 Sheets-Sheet 1

INVENTOR
C. J. BYRNE
BY W. L. Keefauver
ATTORNEY

Aug. 24, 1965 C. J. BYRNE 3,202,765

SYNCHRONIZATION OF FREQUENCY MULTIPLEX SYSTEMS

Filed Aug. 23, 1961 2 Sheets-Sheet 2

INVENTOR
C. J. BYRNE
BY W. L. Keefauver
ATTORNEY

United States Patent Office 3,202,765
Patented Aug. 24, 1965

3,202,765
SYNCHRONIZATION OF FREQUENCY MULTIPLEX SYSTEMS

Charles J. Byrne, Plainfield, N.J., assignor to Bell Telephone Laboratories, Incorporated, New York, N.Y., a corporation of New York Filed Aug. 23, 1961, Ser. No. 133,465
8 Claims. (Cl. 179—15)

This invention relates to frequency multiplex systems and, more particularly, to the synchronization of frequency multiplex systems in which message waves are suppressed-carrier modulated.

Multiplex systems permit message waves from diverse channels to be coalesced and transmitted by a single channel. When the coalescence is in frequency, the diverse channels are typically assembled into groups. Within each group, the message waves are individually modulated onto distinctive carrier signals that cause the modulated waves to be spaced from each other in frequency, generally without overlap. By further multiplexing, the groups can be formed into assemblages that are variously designated as super and master groups.

On occasion it is desirable to suppress certain of the carrier signals used in multiplexing. This is particularly true when one sideband of a modulated wave is suppressed as well. Then the frequency interval occupied by multiplex waves can be considerably reduced. In that case, however, recovery of the message waves requires substitutes for the carrier signals previously suppressed. If the recovery is to distortionless, the substitute signals and the multiplexed waves must be synchronized by bearing a precise frequency relation to each other.

Accordingly, it is an object of the invention to establish synchronism between substitute-carrier signals and suppressed-carrier multiplexed message waves. A related object is to match the frequencies of the substitute signals and their previously suppressed counterparts.

Although it would appear that a pre-existing knowledge of the frequencies of the suppressed-carrier signals would suffice for synchronization by allowing their accurate duplication at a receiver, that is insufficient. For one thing, even the most carefully controlled frequency source is subject to slight drifting, but more importantly, multiplexed waves are generally transposed amoung numerous frequency levels and accrue a slight but unpredictable frequency shift.

While the frequency shift may occur at any time, it most commonly arises during the "frogging" stages of transmission when "leaps" are made from one frequency range to another. As a result of "frogging," the spectral positions of multiplex assemblages are interchanged.

By assuring that the transmitted signals occupy like positions of the frequency spectrum and are subjected to like attenuations, "frogging" eliminates, to a large extent, the necessity for amplitude equalization in a multiplex transmission system. In addition, "frogging" also alleviates the acceleration of undesired modulation products when the multiplexed waves are transmitted over greater distances.

Needless to say, any unpredictable frequency shift makes synchronization difficult. Hence, it is an object of the invention to facilitate synchronziation by eliminating such a frequency shift from frequency multiplexed waves.

However, elimination of frequency shift is of itself insufficient to assure synchronization, and it is a still further object of the invention to simultaneously provide substitute-carrier signals which are constrained to have the frequencies of their suppressed-carrier counterparts.

Since multiplexed waves are typically accompanied by a pilot signal for purposes of gain control, it is another object of the invention to make full use of the pilot signal in obtaining complete synchronization of a frequency multiplex transmission system.

To accomplish the foregoing and related objects, the invention provides that a pilot signal, accompanying multiplexed waves, be supplemented by one or more modulation components attributable to a synchronizing signal. Desirably, the synchronizing signal is related in frequency to both the pilot signal and one or more of the multiplexing signals. Having its carrier present, the synchonizing signal, unlike the multiplexed waves whose carriers may be suppressed, is recovered at a receiver directly and without frequency shift. A comparison of the modulated pilot signal with a counterpart derived from the synchronizing signal establishes the extent of any residual frequency shift and enables its removal at an arbitrary stage of the receiver.

According to one feature of the invention, the modulated pilot signal is passed through a limiter before the comparison to prevent its modulation envelope from degrading the determination of the frequency shift.

It is a further feature of the invention that the synchronizing signal may be used at the receiver in the generation of substitute-carrier signals which ars thus synchronized with the multiplexed message waves.

Other features of the invention will become apparent after consideration of an illustrative embodiment, taken in conjunction with the drawings in which.

Figure 1:
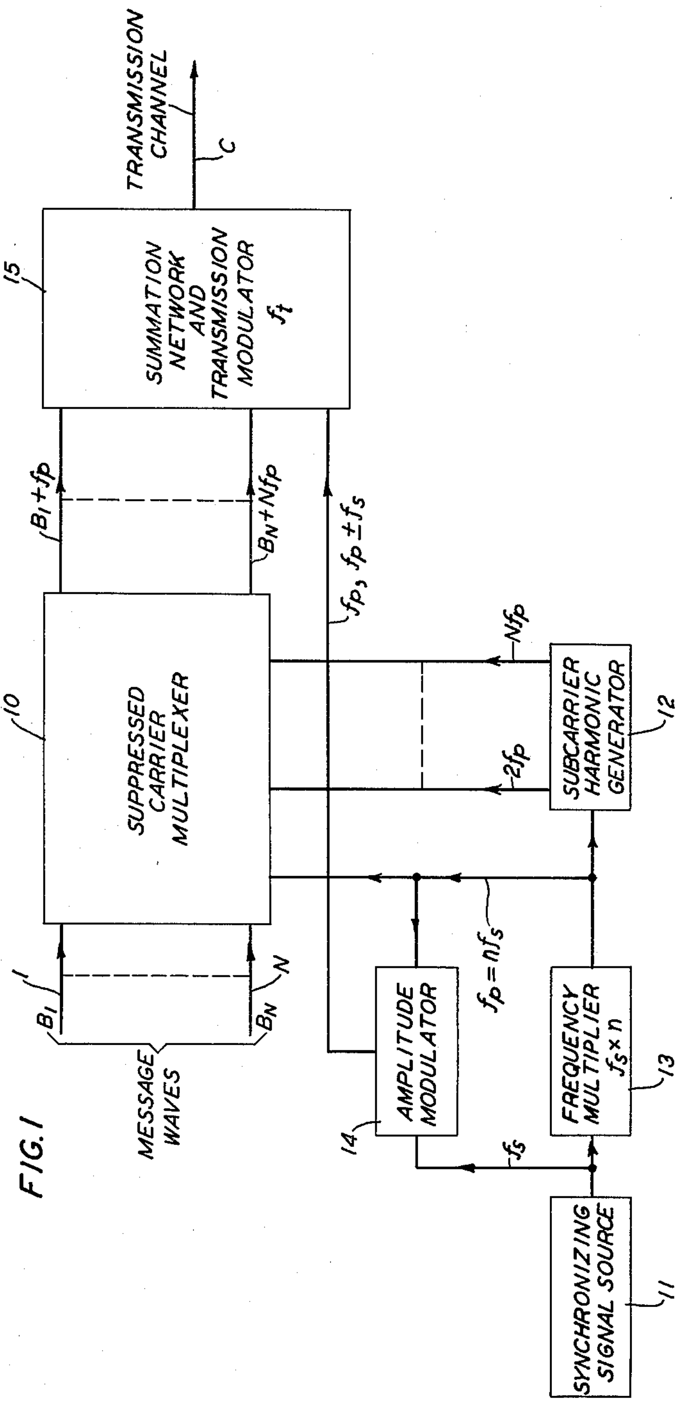
FIG. 1 is a diagram of a transmitter for a synchronized, frequency multiplex system.

Turn now to the suppressed-carrier frequency multiplex transmitter of FIG. 1. Message waves occupying various basebands $B_1$ through $B_N$ and carried by a group of channels 1 through N are applied to a suppressed-carrier multiplexer 10. The multiplexer 10 is also provided with subcarrier signals $f_p$ through $Nf_p$. For convenience the subcarrier signals are integrally related. They originate at a source 11 of a synchronizing signal $f_s$ and are derived from a harmonic generator 12 by way of a frequency multiplier 13, where the synchronizing signal is raised to its $n$th harmonic. One of the subcarrier signals, conveniently the fundamental, serves as a pilot signal $f_p=nf_s$. The pilot signal is supplied with single-frequency, upper and lower sidebands in a conventional amplitude modulator 14 by the synchronizing signal $f_s=f_p/_n$. After being combined in a summation network of a transmission modulator 15, the modulated pilot signal and the multiplexed group of message waves are raised to a frequency level $f_t$ and applied to an outgoing transmission channel C.

Figure 2:
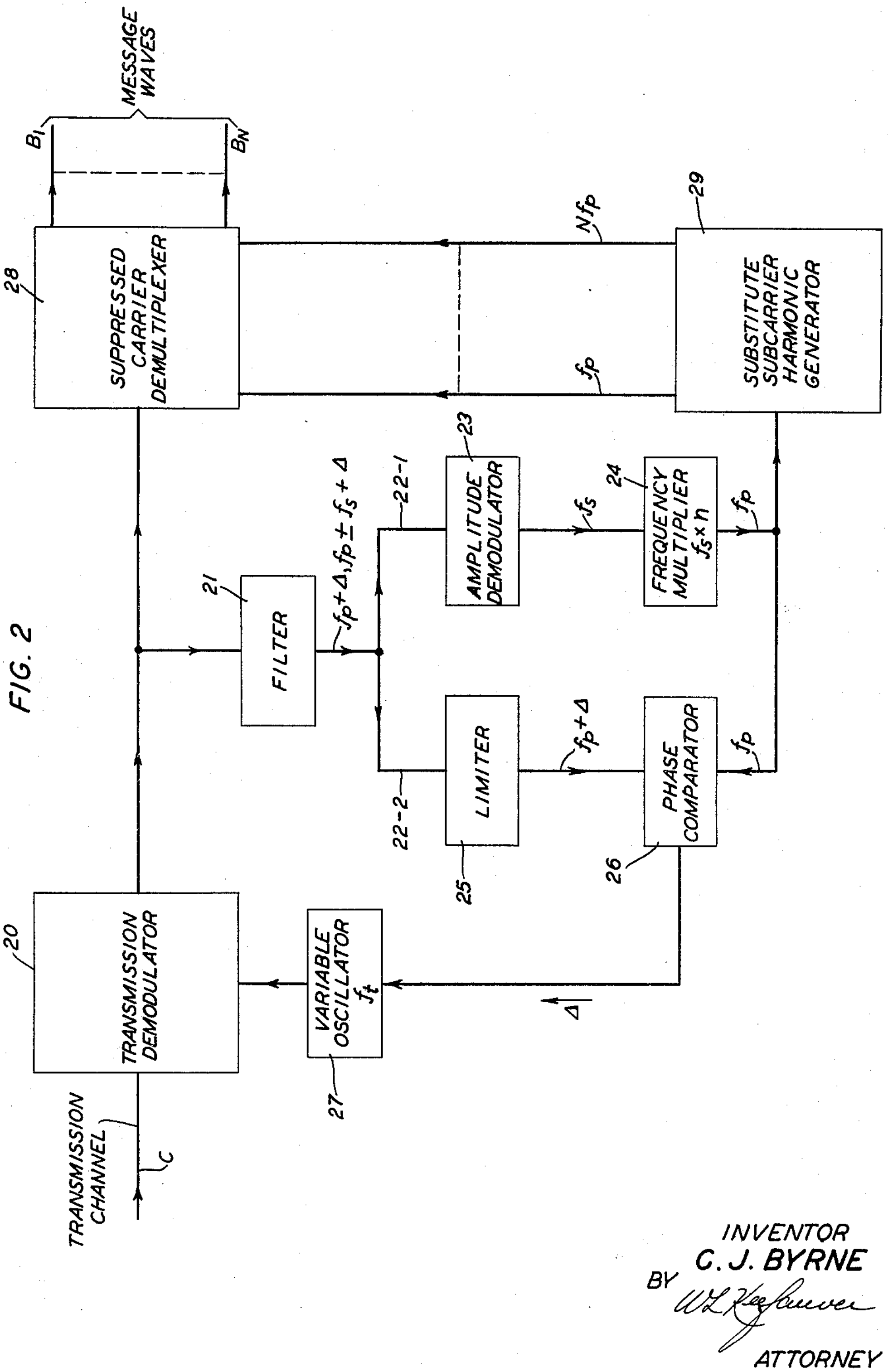
FIG. 2 is a diagram of a receiver for a synchronized, frequency multiplex system.

Upon arriving at the suppressed-carrier frequency multiplex receiver of FIG. 2 by way of the transmission channel C, after having been subjected to various frequency transpositions, the multiplexed group and the modulated pilot signal enter a transmission demodulator 20, which lowers the frequency level of the multiplexed message waves by substantially the amount of the transmission carrier frequency $f_t$. At the output of the demodulator 20 a filter 21 selects the modulated pilot signal $f_p$, $f_p \pm f_s$, as accompanied by an uncompensated frequency shift $\Delta$, and applies it to two synchronization paths 22–1 and 22–2. In the first path 22–1 an amplitude demodulator 23 is used to recover the synchronizing signal $f_s$ from the modulation envelope of the pilot signal $f_p+\Delta$. Subsequently, a frequency multiplier 24 generates the $n$th harmonic of the synchronizing signal $f_s$, which is the error-free counterpart $f_p$ of the pilot signal $f_p+\Delta$. In the second path 22–2 the modulation envelope of the uncorrected pilot signal $f_p+\Delta$ is initially removed. This can be done by an amplitude limiter 25 since the upper and lower sidesignals $f_p \pm f_s$ merely serve to produce amplitude variations in the uncorrected pilot signal $f_p+\Delta$. Once recovered the uncorrected pilot signal $f_p+\Delta$, and the derived pilot signal $f_p$ are compared in a phase comparator 26 to determine the extent of the uncompensated frequency shift $\Delta$. This shift $\Delta$ may be partly attributable to any lack of synchronism between the variable oscillator 27 used with the transmission demodulator 20 and a corresponding oscillator included in the transmission modulator 15 of FIG. 1, but its primary component is the uncompensated frequency shift that accrued during transmission. Since the output of the phase comparator 26 is used to adjust the frequency of the variable oscillator 27 controlling the transmission demodulator 20, the output of the demodulator 20 is ultimately error-corrected. Concurrently, the substitute-carrier signals $f_p$ through $Nf_p$ for the demultiplexer 28 are obtained from the derived pilot signal in a harmonic generator 29. The individual outputs of the demultiplexer 28 contain the various baseband message waves $B_1$ through $B_N$ processed by the multiplexer 10 of FIG. 1.

Figure 3:
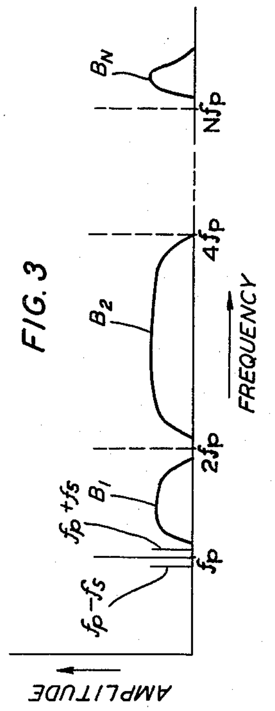
FIG. 3 is a graph of a partial frequency spectrum applicable to frequency multiplexing according to the invention.

A more complete understanding of the invention is had by considering the partial frequency spectrum of FIG. 3 that applies in the case of suppressed-carrier amplitude modulation. The spectral positions of the subcarrier signals $f_p$ through $Nf_p$ are marked along the axis of abscissas. Those that are suppressed are indicated by dashed lines. For convenience the subcarrier signals are integral multiples of the pilot signal $f_p$ and are sufficiently separated to prevent any overlap of the modulated message waves. The multiplexer 10 (FIG. 1) modulates each baseband message wave $B_1$ through $B_N$ upon a corresponding subcarrier signal $f_p$ through $Nf_p$. By filtering, only the upper sidebands $f_p+B_1$ through $Nf_p+B_N$ are retained.

As shown in FIG. 3, the lowest order subcarrier signal also serves as the pilot signal. It is separately modulated by the synchronizing signal $f_s$ from which it was derived. If the multiplier $n$ of the synchronizing signal is large, the frequency interval occupied by the modulation components $f_p \pm f_s$ of the pilot signal can be confined to the guard band between channels. But, it is desirable in some instances to use a complete channel for the pilot signal and to suppress one of its sidebands. Then, the amplitude demodulator of FIG. 2 can be of the synchronous type.

During transmission the frequency spectrum of FIG. 3 is translated to the position of the transmission carrier signal $f_t$. On reception, the translation imparted by the transmission carrier signal is substantially removed and the frequency spectrum again becomes that of FIG. 3, with a slight shift that is removed as compensation takes place. For an amplitude modulated pilot signal both the carrier and its sidebands are affected equally by frequency transpositions, so that the modulation envelope, containing the synchronizing signal, is recoverable without frequency shift. Initially, the frequency shift, indicated by the phase comparator 26 (FIG. 2), corresponds to the entire frequency shift of the system, but within a short time, the compensated pilot signal at the output of the limiter 25 and the pilot signal derived from the synchronizing signal have substantially the same frequency.

Thus, any unpredictable frequency shift is removed from the multiplexed waves which are completely synchronized with substitute-carrier signals generated at the receiver.

Related adaptations of the synchronizing principle and the various employments of the modulated pilot signal in conjunction with multiplex systems will occur to those skilled in the art. It will also be appreciated that the invention is readily applicable to the synchronization of multiplex systems in which carrier signals are not suppressed.

What is claimed is:

1. A suppressed-carrier frequency multiplex system comprising means for generating a plurality of suppressed-carrier frequency-displaced message-bearing signals, a source of a synchronizing signal of frequency $f_s$, a source of a pilot signal of frequency $f_p$, means for modulating said pilot signal by said synchronizing signal to produce a modulated pilot signal having components of frequencies $f_p$, $f_p+f_s$ and $f_p-f_s$, a remote receiver station, and means for transmitting said suppressed-carrier signals, along with said modulated pilot signal, to said receiver station over a transmission medium likely to impart an unpredictable frequency shift $\Delta$ to the transmitted signals.

2. Apparatus as defined in claim 1 wherein the modulated pilot signal at said receiver station has components of frequencies $f_p+\Delta$, $f_p+f_s+\Delta$ and $f_p-f_s+\Delta$, further including means responsive to the received pilot signal for deriving a control signal of amplitude proportional to said frequency shift $\Delta$, and means responsive to said control signal for eliminating said frequency shift from the received message-bearing signals.

3. Apparatus for determining the frequency shift of a suppressed-carrier message wave accompanied by a pilot carrier that has been amplitude-modulated by one of its subharmonics, which comprises means for filtering the amplitude-modulated pilot carrier from the message wave, means for demodulating said amplitude-modulated pilot carrier to recover a subharmonic thereof that is unshifted in frequency, means for limiting the amplitude of said pilot carrier to derive a frequency-shifted pilot carrier, and means for comparing a harmonic of the demodulated pilot carrier with said frequency-shifted pilot carrier to obtain a measure of the frequency shift of said message wave.

4. Apparatus for removing an unpredictable frequency shift from an incoming suppressed-carrier message wave accompanied by the carrier and sidebands of a pilot signal that has been amplitude-modulated by a subharmonic thereof, which comprises a demodulator for translating the frequencies of the suppressed-carrier message wave and the modulated pilot signal, means for controlling the translation frequency of said demodulator, a filter connected to the output of said demodulator and proportioned to pass said modulated pilot signal, a first path connected to said filter and including a limiter whose output has a frequency which is that of the pilot carrier supplemented by the unpredictable frequency shift, a second path connected to said filter and including an amplitude demodulator connected in series with a frequency multiplier whose output is said pilot carrier, and means connected to said controlling means for comparing the outputs of the first and second paths and for adjusting the translation frequency of said controlling means to eliminate said unpredictable frequency shift.

5. Apparatus for synchronizing suppressed-carrier modulated message waves, originating at a transmitter and subject to an unpredictable frequency shift during transmission, with demodulating signals at a receiver, which comprises means for accompanying the suppressed-carrier message waves by a modulated pilot signal with its carrier present, means for recovering the modulation component of said pilot signal at the receiver without frequency shift, and means, responsive to said recovering means, for correcting the frequency shift of said suppressed-carrier message waves, thereby to establish substantial compatibility between the receiver demodulating signals and said suppressed-carrier message waves.

6. Apparatus as defined in claim 5 wherein said correcting means includes means for limiting the amplitude of said pilot signal.

7. Apparatus as defined in claim 5 further including, means for deriving said demodulating signals from the recovered modulation component thereby to enhance the compatibility between said demodulating signal and said modulated waves.

8. In a frequency multiplex transmission system, means for generating a plurality of carrier signals having distinctly different positions on a frequency scale, means for modulating certain of the carrier signals with individual message waves and for suppressing one sideband and the carrier of each message modulated wave, leaving an assemblage of message sidebands with predictable initial positions on said frequency scale, means for modulating one of said carrier signals, designated a pilot, with a synchronizing signal, means for transmitting said suppressed-carrier message sideband assemblage, along with the designated pilot carrier and the sidesignal components of the pilot as modulated, to a remote location over a transmission medium in which all transmitted components may acquire a residual frequency shift causing their positions on said frequency scale to become unpredictable, means at said remote location for recovering said synchronizing signal from the envelope of said modulated pilot, whereby the recovered synchronizing signal is free from said residual frequency shift, and means for utilizing said recovered synchronizing signal to restore all of said message sidebands to their predictable positions on said frequency scale.

References Cited by the Examiner

UNITED STATES PATENTS

| | | | |
|---|---|---|---|
| 2,699,494 | 1/55 | Albricht | 325—49 |
| 2,849,605 | 5/58 | Fickett et al. | 179—15 |
| 2,871,295 | 1/59 | Stachiewicz | 325—49 |
| 3,088,070 | 4/63 | Robel | 325—49 |

FOREIGN PATENTS

| | | |
|---|---|---|
| 636,467 | 5/50 | Great Britain. |

DAVID G. REDINBAUGH, *Primary Examiner.*